United States Patent
Iyer et al.

(10) Patent No.: US 10,402,807 B1
(45) Date of Patent: Sep. 3, 2019

(54) ESTIMATING INTERCHANGE FEES FOR CARD PAYMENTS

(71) Applicant: Square, Inc., San Francisco, CA (US)

(72) Inventors: Kalyani Iyer, San Francisco, CA (US); Mehmet Zahit Guneri, Sunnyvale, CA (US); Dennis Jarosch, Berkeley, CA (US); Michael Ward, San Francisco, CA (US); Kenji Kaneda, Cupertino, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/444,898

(22) Filed: Feb. 28, 2017

(51) Int. Cl.
*G06Q 20/20* (2012.01)
*G06N 5/04* (2006.01)
*G06Q 20/34* (2012.01)
*G06N 20/00* (2019.01)

(52) U.S. Cl.
CPC ........... *G06Q 20/202* (2013.01); *G06N 5/04* (2013.01); *G06N 20/00* (2019.01); *G06Q 20/20* (2013.01); *G06Q 20/34* (2013.01)

(58) Field of Classification Search
CPC ............................ G06Q 20/202; G06Q 20/20
USPC ....................................................... 705/21, 16
See application file for complete search history.

(56) References Cited

U.S. PATENT DOCUMENTS

| | | |
|---|---|---|
| 3,854,036 A | 12/1974 | Gupta et al. |
| 4,035,614 A | 7/1977 | Frattarola et al. |
| 4,254,441 A | 3/1981 | Fisher |
| 4,591,937 A | 5/1986 | Nakarai et al. |
| 4,788,420 A | 11/1988 | Chang et al. |
| 4,845,740 A | 7/1989 | Tokuyama et al. |
| 5,173,597 A | 12/1992 | Anglin |
| 5,266,789 A | 11/1993 | Anglin et al. |
| 5,434,400 A | 7/1995 | Scherzer |
| 5,463,678 A | 10/1995 | Kepley, III et al. |
| 5,589,855 A | 12/1996 | Blumstein et al. |
| 5,679,943 A | 10/1997 | Schultz et al. |
| 5,764,742 A | 6/1998 | Howard et al. |

(Continued)

FOREIGN PATENT DOCUMENTS

| | | |
|---|---|---|
| JP | 2001-313714 A | 11/2001 |
| JP | 2003-108777 A | 4/2003 |

(Continued)

OTHER PUBLICATIONS

"2.5mm Headset Jack," Retrieved from the Internet URL: http://www.phonescoop.com/glossary/term.php?gid=360, on May 5, 2011, pp. 1-1.

(Continued)

*Primary Examiner* — Florian M Zeender
*Assistant Examiner* — Christopher B Buchanan
(74) *Attorney, Agent, or Firm* — Lee & Hayes, P.C.

(57) ABSTRACT

A payment processing system is configured to support purchase transactions generated by merchant point-of-sale (POS) devices. Information regarding the purchase transactions is archived and periodically analyzed using machine learning to create a predictive model relating transaction attributes to bank interchange fees. The predictive model is then used to estimate interchange fees that are later passed on to merchants. This allows more accurate settlement with merchants in situations where reports regarding actual interchange fees are not yet available.

20 Claims, 6 Drawing Sheets

(56) References Cited

U.S. PATENT DOCUMENTS

| | | | |
|---|---|---|---|
| 5,850,599 A | 12/1998 | Seiderman | |
| 5,945,654 A | 8/1999 | Huang | |
| 5,983,208 A | 11/1999 | Haller et al. | |
| 6,006,109 A | 12/1999 | Shin | |
| 6,021,944 A | 2/2000 | Arakaki | |
| 6,032,859 A | 3/2000 | Muehlberger et al. | |
| 6,061,666 A | 5/2000 | Do et al. | |
| 6,129,277 A | 10/2000 | Grant et al. | |
| 6,192,408 B1 | 2/2001 | Vahalia et al. | |
| 6,234,389 B1 | 5/2001 | Valliani et al. | |
| 6,341,353 B1 | 1/2002 | Herman et al. | |
| 6,363,139 B1 | 3/2002 | Zurek et al. | |
| 6,400,517 B1 | 6/2002 | Murao | |
| 6,431,445 B1 | 8/2002 | DeLand et al. | |
| 6,445,717 B1 | 9/2002 | Gibson et al. | |
| 6,476,743 B1 | 11/2002 | Brown et al. | |
| 6,481,623 B1 | 11/2002 | Grant et al. | |
| 6,536,670 B1 | 3/2003 | Postman et al. | |
| 6,579,728 B2 | 6/2003 | Grant et al. | |
| 6,725,200 B1 | 4/2004 | Rost | |
| 6,850,147 B2 | 2/2005 | Prokoski et al. | |
| 6,896,182 B2 | 5/2005 | Sakaguchi | |
| 6,898,598 B2 | 5/2005 | Himmel et al. | |
| 6,944,782 B2 | 9/2005 | von Mueller et al. | |
| 6,999,943 B1 | 2/2006 | Johnson et al. | |
| 7,003,316 B1 | 2/2006 | Elias et al. | |
| 7,062,463 B2 * | 6/2006 | Knapp | G06Q 20/042 705/39 |
| 7,149,296 B2 | 12/2006 | Brown et al. | |
| 7,203,666 B1 * | 4/2007 | Gravell | G06Q 20/108 380/51 |
| 7,252,232 B2 | 8/2007 | Fernandes et al. | |
| 7,309,012 B2 | 12/2007 | von Mueller et al. | |
| 7,324,836 B2 | 1/2008 | Steenstra et al. | |
| 7,363,054 B2 | 4/2008 | Elias et al. | |
| 7,409,234 B2 | 8/2008 | Glezerman | |
| 7,433,452 B2 | 10/2008 | Taylor et al. | |
| 7,506,812 B2 | 3/2009 | von Mueller et al. | |
| 7,520,430 B1 | 4/2009 | Stewart et al. | |
| 7,581,678 B2 | 9/2009 | Narendra et al. | |
| 7,600,673 B2 | 10/2009 | Stoutenburg et al. | |
| 7,703,676 B2 | 4/2010 | Hart et al. | |
| 7,708,189 B1 | 5/2010 | Cipriano | |
| 7,757,953 B2 | 7/2010 | Hart et al. | |
| 7,793,834 B2 | 9/2010 | Hachey et al. | |
| 7,810,729 B2 | 10/2010 | Morley | |
| 7,869,591 B1 | 1/2011 | Nagel et al. | |
| 7,896,248 B2 | 3/2011 | Morley | |
| 7,918,394 B1 | 4/2011 | Morley, Jr. | |
| 8,011,587 B2 | 9/2011 | Johnson et al. | |
| 8,190,564 B2 | 5/2012 | Pang | |
| 8,231,055 B2 | 7/2012 | Wen | |
| 8,336,771 B2 | 12/2012 | Tsai et al. | |
| 8,376,239 B1 | 2/2013 | Humphrey | |
| 8,413,901 B2 | 4/2013 | Wen | |
| 8,500,010 B1 | 8/2013 | Marcus et al. | |
| 8,560,823 B1 | 10/2013 | Aytek et al. | |
| 8,571,989 B2 | 10/2013 | Dorsey et al. | |
| 8,573,487 B2 | 11/2013 | McKelvey | |
| 8,573,489 B2 | 11/2013 | Dorsey et al. | |
| 8,584,946 B2 | 11/2013 | Morley | |
| 8,602,305 B2 | 12/2013 | Dorsey et al. | |
| 8,612,352 B2 | 12/2013 | Dorsey et al. | |
| 8,615,445 B2 | 12/2013 | Dorsey et al. | |
| 8,640,953 B2 | 2/2014 | Dorsey et al. | |
| 8,678,277 B2 | 3/2014 | Dorsey et al. | |
| 8,701,996 B2 | 4/2014 | Dorsey et al. | |
| 8,701,997 B2 | 4/2014 | Dorsey et al. | |
| 8,763,900 B2 | 7/2014 | Marcus et al. | |
| 8,794,517 B1 | 8/2014 | Templeton et al. | |
| 8,806,554 B2 * | 8/2014 | Stiliadis | G06Q 30/02 725/114 |
| 9,129,321 B2 | 9/2015 | Boding et al. | |
| 9,412,107 B2 * | 8/2016 | Canis | G06Q 20/4016 |
| 9,436,938 B1 | 9/2016 | Botros et al. | |
| 9,576,287 B1 | 2/2017 | Kalinichenko et al. | |
| 9,633,033 B2 | 4/2017 | Vijayan et al. | |
| 2002/0002507 A1 | 1/2002 | Hatakeyama | |
| 2002/0030871 A1 | 3/2002 | Anderson et al. | |
| 2002/0077974 A1 | 6/2002 | Ortiz | |
| 2002/0095303 A1 | 7/2002 | Asayama et al. | |
| 2002/0116329 A1 | 8/2002 | Serbetcioglu et al. | |
| 2002/0165462 A1 | 11/2002 | Westbrook et al. | |
| 2002/0174063 A1 | 11/2002 | Major | |
| 2003/0080186 A1 | 5/2003 | McDonald et al. | |
| 2003/0089772 A1 | 5/2003 | Chien | |
| 2003/0132300 A1 | 7/2003 | Dilday et al. | |
| 2003/0144040 A1 | 7/2003 | Liu et al. | |
| 2004/0012875 A1 | 1/2004 | Wood | |
| 2004/0033726 A1 | 2/2004 | Kao | |
| 2004/0041911 A1 | 3/2004 | Odagiri et al. | |
| 2004/0093496 A1 | 5/2004 | Colnot | |
| 2004/0104268 A1 | 6/2004 | Bailey | |
| 2004/0127256 A1 | 7/2004 | Goldthwaite et al. | |
| 2004/0128256 A1 | 7/2004 | Krouse et al. | |
| 2004/0151026 A1 | 8/2004 | Naso et al. | |
| 2004/0204074 A1 | 10/2004 | Desai | |
| 2004/0230524 A1 | 11/2004 | Meiners | |
| 2005/0077870 A1 | 4/2005 | Ha et al. | |
| 2005/0119972 A1 | 6/2005 | Inglis | |
| 2005/0138461 A1 | 6/2005 | Allen et al. | |
| 2005/0156037 A1 | 7/2005 | Wurzburg | |
| 2005/0156038 A1 | 7/2005 | Wurzburg et al. | |
| 2005/0194452 A1 | 9/2005 | Nordentoft et al. | |
| 2005/0218206 A1 | 10/2005 | Ohno et al. | |
| 2005/0242173 A1 | 11/2005 | Suzuki | |
| 2006/0000917 A1 | 1/2006 | Kim et al. | |
| 2006/0064380 A1 | 3/2006 | Zukerman | |
| 2006/0094481 A1 | 5/2006 | Gullickson | |
| 2006/0122902 A1 | 6/2006 | Petrov et al. | |
| 2006/0152276 A1 | 7/2006 | Barksdale | |
| 2006/0159011 A1 | 7/2006 | Dalal et al. | |
| 2006/0208066 A1 | 9/2006 | Finn et al. | |
| 2006/0223580 A1 | 10/2006 | Antonio et al. | |
| 2006/0234771 A1 | 10/2006 | Shavrov | |
| 2007/0063048 A1 | 3/2007 | Havens et al. | |
| 2007/0067833 A1 | 3/2007 | Colnot | |
| 2007/0090183 A1 | 4/2007 | Hursta et al. | |
| 2007/0100651 A1 | 5/2007 | Ramer et al. | |
| 2007/0155430 A1 | 7/2007 | Cheon et al. | |
| 2007/0213970 A1 | 9/2007 | Puthupparambil et al. | |
| 2007/0221728 A1 | 9/2007 | Ferro et al. | |
| 2007/0233615 A1 | 10/2007 | Tumminaro | |
| 2007/0244811 A1 | 10/2007 | Tumminaro | |
| 2007/0250441 A1 | 10/2007 | Paulsen et al. | |
| 2007/0250623 A1 | 10/2007 | Hickey et al. | |
| 2007/0255653 A1 | 11/2007 | Tumminaro et al. | |
| 2008/0021803 A1 * | 1/2008 | Ahles | G06Q 20/04 705/35 |
| 2008/0027815 A1 | 1/2008 | Johnson et al. | |
| 2008/0040261 A1 | 2/2008 | Nix et al. | |
| 2008/0040274 A1 | 2/2008 | Uzo | |
| 2008/0059370 A1 | 3/2008 | Sada et al. | |
| 2008/0059375 A1 | 3/2008 | Abifaker | |
| 2008/0098393 A1 | 4/2008 | Chai et al. | |
| 2008/0177662 A1 | 7/2008 | Smith et al. | |
| 2008/0238610 A1 | 10/2008 | Rosenberg | |
| 2008/0313077 A1 | 12/2008 | Schropfer | |
| 2009/0068982 A1 | 3/2009 | Chen et al. | |
| 2009/0098908 A1 | 4/2009 | Silverbrook et al. | |
| 2009/0104920 A1 | 4/2009 | Moon et al. | |
| 2009/0117883 A1 | 5/2009 | Coffing et al. | |
| 2009/0119190 A1 | 5/2009 | Realini | |
| 2009/0159681 A1 | 6/2009 | Mullen et al. | |
| 2010/0063893 A1 | 3/2010 | Townsend | |
| 2010/0128598 A1 | 5/2010 | Gandhewar et al. | |
| 2010/0184479 A1 | 7/2010 | Griffin | |
| 2010/0205078 A1 | 8/2010 | Lawrence et al. | |
| 2010/0243732 A1 | 9/2010 | Wallner | |
| 2010/0332339 A1 | 12/2010 | Patel et al. | |
| 2011/0016052 A1 | 1/2011 | Scragg | |
| 2011/0053560 A1 | 3/2011 | Jain et al. | |
| 2011/0055628 A1 | 3/2011 | Dennis et al. | |
| 2011/0055835 A1 | 3/2011 | Dennis et al. | |

(56) References Cited

U.S. PATENT DOCUMENTS

| | | |
|---|---|---|
| 2011/0084131 A1 | 4/2011 | McKelvey |
| 2011/0084139 A1 | 4/2011 | McKelvey et al. |
| 2011/0084147 A1 | 4/2011 | Wilson et al. |
| 2011/0137803 A1 | 6/2011 | Willins |
| 2011/0161235 A1 | 6/2011 | Beenau et al. |
| 2011/0198395 A1 | 8/2011 | Chen |
| 2011/0202463 A1 | 8/2011 | Powell |
| 2011/0258120 A1 | 10/2011 | Weiss |
| 2012/0005039 A1 | 1/2012 | Dorsey et al. |
| 2012/0008851 A1 | 1/2012 | Pennock et al. |
| 2012/0011071 A1 | 1/2012 | Pennock et al. |
| 2012/0012653 A1 | 1/2012 | Johnson et al. |
| 2012/0022945 A1 | 1/2012 | Falkenborg et al. |
| 2012/0052910 A1 | 3/2012 | Mu et al. |
| 2012/0061467 A1 | 3/2012 | Tang et al. |
| 2012/0095869 A1 | 4/2012 | McKelvey |
| 2012/0095871 A1 | 4/2012 | Dorsey et al. |
| 2012/0095906 A1 | 4/2012 | Dorsey et al. |
| 2012/0095907 A1 | 4/2012 | Dorsey et al. |
| 2012/0095916 A1 | 4/2012 | Dorsey et al. |
| 2012/0097739 A1 | 4/2012 | Babu et al. |
| 2012/0113796 A1 | 5/2012 | Qiu et al. |
| 2012/0118956 A1 | 5/2012 | Lamba et al. |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba et al. |
| 2012/0126010 A1 | 5/2012 | Babu et al. |
| 2012/0126011 A1 | 5/2012 | Lamba et al. |
| 2012/0126012 A1 | 5/2012 | Lamba et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0132712 A1 | 5/2012 | Babu et al. |
| 2012/0138683 A1 | 6/2012 | Sather et al. |
| 2012/0168505 A1 | 7/2012 | Sather et al. |
| 2012/0185392 A1 | 7/2012 | Hubbs et al. |
| 2012/0191525 A1 | 7/2012 | Singh et al. |
| 2012/0232980 A1 | 9/2012 | Wald et al. |
| 2012/0234918 A1 | 9/2012 | Lindsay |
| 2012/0259651 A1 | 10/2012 | Mallon et al. |
| 2012/0270528 A1 | 10/2012 | Goodman |
| 2013/0031003 A1 | 1/2013 | Dorsey et al. |
| 2013/0031004 A1 | 1/2013 | Dorsey et al. |
| 2013/0080239 A1 | 3/2013 | Okerlund |
| 2013/0087614 A1 | 4/2013 | Limtao et al. |
| 2013/0173464 A1 | 7/2013 | Quillian |
| 2013/0200153 A1 | 8/2013 | Dorsey et al. |
| 2013/0207481 A1 | 8/2013 | Gobburu et al. |
| 2013/0254117 A1 | 9/2013 | von Mueller et al. |
| 2014/0001257 A1 | 1/2014 | Dorsey et al. |
| 2014/0001263 A1 | 1/2014 | Babu et al. |
| 2014/0006188 A1* | 1/2014 | Grigg .................... G06Q 20/20 705/17 |
| 2014/0012701 A1* | 1/2014 | Wall ...................... G06Q 20/383 705/26.8 |
| 2014/0017955 A1 | 1/2014 | Lo et al. |
| 2014/0061301 A1 | 3/2014 | Cho et al. |
| 2014/0076964 A1 | 3/2014 | Morley |
| 2014/0097242 A1 | 4/2014 | McKelvey |
| 2014/0124576 A1 | 5/2014 | Zhou et al. |
| 2014/0129423 A1 | 5/2014 | Murphy et al. |
| 2014/0144983 A1 | 5/2014 | Dorsey et al. |
| 2014/0149286 A1 | 5/2014 | Forsyth |
| 2014/0156480 A1 | 6/2014 | Qaim-Maqami et al. |
| 2014/0203082 A1 | 7/2014 | Huh |
| 2014/0351012 A1 | 11/2014 | Jernigan et al. |
| 2014/0372234 A1 | 12/2014 | Tikku |
| 2015/0371212 A1 | 12/2015 | Giordano et al. |
| 2017/0004487 A1* | 1/2017 | Hagen ................ G06Q 20/3224 |

FOREIGN PATENT DOCUMENTS

| | | |
|---|---|---|
| JP | 2004-078662 A | 3/2004 |
| JP | 2005-269172 A | 9/2005 |
| JP | 2006-139641 A | 6/2006 |
| JP | 2006-179060 A | 7/2006 |
| JP | 2006-308438 A | 11/2006 |
| KR | 10-0452161 B1 | 10/2004 |
| KR | 10-2005-0077659 A | 8/2005 |
| KR | 10-2008-0039330 A | 5/2008 |
| WO | 01/65827 A2 | 9/2001 |
| WO | 02/084548 A1 | 10/2002 |
| WO | 2010/097711 A2 | 9/2010 |
| WO | 2010/135174 A1 | 11/2010 |

OTHER PUBLICATIONS

"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards- . . . , on Feb. 8, 2011, pp. 1-3.

Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.

"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-sid . . . , on Apr. 19, 2011, pp. 1-2.

"Arduino magnetic stripe decoder," Instructables, Retrieved from the Internet URL: http://www.instructables.com/id/Arduino-magneticstripe-decorder, on Feb. 8, 2011, pp. 1-5.

"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.

Bauer, G.R. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.

Bourdeauducq, S., "Reading magnetic cards (almost) for free" ("Lekernel"), Jan. 26, 2009, Retrieved from the Internet URL: http://lekernel.net/blog/?p=12, on May 5, 2011, pp. 1-2.

Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.

"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.

"Get paid on the spot from your mobile phone," Retrieved from the Internet URL: http://payments.intuit.com/products/basic-payment-solutions/mobile-credit-card-processin . . . , on Feb. 11, 2011, pp. 1-3.

Grandison, K., "vTerminal Credit Card Processing App for AuthorizeNet and PayPal Payflow Pro For Curve 8350 8500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.

Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.

"Headphone Jack (3.5mm)," Retrieved from the Internet URL: http://www.phonescoop.com/glossary/term.php?gid=440, on May 5, 2011, pp. 1-1.

Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.

(56) References Cited

OTHER PUBLICATIONS

Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.
Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.
"Magnetic Card Reader," lekernel.net~scrapbook, Retrieved from the Internet URL: http://lekernel.net/scrapbook/old/cardreader.html, on Apr. 25, 2011, pp. 1-4.
"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.
"Magnetic stripe reader/writer," Retrieved from the Internet URL: http://www.gae.ucm.es/-padilla/extrawork/stripe.html, on Dec. 21, 2009, pp. 1-2.
"Mag-stripe readers The hunt for a homebrew mag-stripe reader that'll work with modem," Jan. 16, 2009, Retrieved from the Internet URL: http://www.hak5.org/forums/index.php?showtopic=11563&st=20, on Apr. 25, 2011, pp. 1-6.
"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK/, on Feb. 8, 2011, pp. 1-1.
"MSR500EX (Mini123EX) Portable Magnetic Stripe Card Reader," TYNER, Apr. 27, 2007, Retrieved from the Internet URL: http://www.tyner.com/magnetic/msr500ex.htm, on Apr. 22, 2011, pp. 1-3.
Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.
Padilla, L., "Magnetic stripe reader circuit," Jan. 28, 1997, Retrieved from the Internet URL: http://www.gae.ucm.es/~padilla/extraworklmagamp.html, on May 5, 2011, pp. 1-7.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.
"Pay@PC," Retrieved from the Internet URL: http://www.merchantanywhere.com/PAY_AT_PCT@PC.htm, on Feb. 11, 2011, pp. 1-2.
"Reference Designations for Electrical and Electronics Parts and Equipment, Engineering Drawing and Related Documentation Practices," ASME Y14.44-2008, The American Society of Mechanical Engineers, Nov. 21, 2008, pp. 1-31.
"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.
Titlow, J.P., "ROAM pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.
"Touch-Pay Wireless Credit Card Processing," MerchantSeek, Retrieved from the Internet URL: http://www.merchantseek.com/wireless-credit-card-processing.htm, on Feb. 11, 2011, pp. 1-5.
"Travel industry targeted for Palm PDA card reader," Retrieved from the Internet URL: http://www.m-travel.com/news/2001/08/travel_industry.html, on Apr. 19, 2011, pp. 1-2.
"USB Magnetic Stripe Credit/Card Track-2 Reader and Writer (75/210BPI)," Deal Extreme (dealextreme.com), Nov. 15, 2008, Retrieved from the Internet URL: http://www.dealextreme.com/p/usb-magnetic-stripe-credit-debit-card-track-2-reader-and-wr . . . , on Feb. 8, 2011, pp. 1-3.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
Website: www.alexwinston.com, Aug. 31, 2009, pp. 1-5.
Non-Final Office Action dated Jul. 30, 2014, for U.S. Appl. No. 14/266,504, of Bhatt, A., et al., filed Apr. 30, 2014.
Non-Final Office Action dated Sep. 30, 2014, for U.S. Appl. No. 13/802,630, of Kalinichenko, A., et al., filed Mar. 13, 2013.
Final Office Action dated Dec. 3, 2014, for U.S. Appl. No. 14/266,504, of Bhatt, A., et al., filed Apr. 30, 2014.
Non-Final Office Action dated Mar. 13, 2015, for U.S. Appl. No. 13/802,630, of Kalinichenko, A., et al., filed Mar. 13, 2013.
Non-Final Office Action dated Mar. 27, 2015, U.S. Appl. No. 14/177,201, of Templeton, T., et al., filed Feb. 10, 2014.
Non-Final Office Action dated Jun. 19, 2015, for U.S. Appl. No. 13/802,630, of Kalinichenko, A., et al., filed Mar. 13, 2013.
Notice of Allowance dated Aug. 19, 2015, in U.S. Appl. No. 14/711,120, of Botros, P.A., et al., filed May 13, 2015.
Non-Final Office Action dated Sep. 28, 2015, in U.S. Appl. No. 14/711,120, of Botros, P.A., et al., filed May 13, 2015.
Non-Final Office Action dated Nov. 13, 2015, for U.S. Appl. No. 14/177,201, of Templeton, T., et al., filed Feb. 10, 2014.
Non-Final Office Action dated Jan. 20, 2016, for U.S. Appl. No. 13/802,630, of Kalinichenko, A., et al., filed Mar. 13, 2013.
Final Office Action dated Feb. 18, 2016, in U.S. Appl. No. 14/711,120, of Botros, P.A., et al., filed May 13, 2015.
Notice of Allowance dated May 4, 2016, in U.S. Appl. No. 14/711,120, of Botros, P.A., et al., filed May 13, 2015.
Final Office Action dated May 31, 2016, for U.S. Appl. No. 14/177,201, of Templeton, T., et al., filed Feb. 10, 2014.
Final Office Action dated Jul. 15, 2016, for U.S. Appl. No. 13/802,630, of Kalinichenko, A., et al., filed Mar. 13, 2013.
Non-Final Office Action dated Sep. 9, 2016, for U.S. Appl. No. 14/461,146, of Kim, M., filed Aug. 15, 2014.
Non-Final Office Action dated Sep. 22, 2016, for U.S. Appl. No. 14/177,201, of Templeton, T., et al., filed Feb. 10, 2014.
Notice of Allowance dated Oct. 7, 2016, for U.S. Appl. No. 13/802,630, of Kalinichenko, A., et al., filed Mar. 13, 2013.
Non-Final Office Action dated Dec. 7, 2016, U.S. Appl. No. 14/184,590, of Dorogusker, J., et al., filed Feb. 19, 2014.
Final Office Action dated Apr. 18, 2017, for U.S. Appl. No. 14/461,146, of Kim, M., filed Aug. 15, 2014.
Final Office Action dated Jun. 16, 2017, for U.S. Appl. No. 14/184,590, of Dorogusker, J., et al., filed Feb. 19, 2014.
Advisory Action dated Aug. 11, 2017, for U.S. Appl. No. 14/184,590, of Dorogusker, J., et al., filed Feb. 19, 2014.
Final Office Action dated Sep. 7, 2017, for U.S. Appl. No. 14/177,201, of Templeton, T., et al., filed Feb. 10, 2014.
Non-Final Office Action dated Oct. 5, 2017, for U.S. Appl. No. 14/461,146, of Kim, M., filed Aug. 15, 2014.
Advisory Action dated Jan. 4, 2018, for U.S. Appl. No. 14/177,201, of Templeton, T., et al., filed Feb. 10, 2014.
Non-Final Office Action dated Mar. 2, 2018, U.S. Appl. No. 14/184,590, of Dorogusker, J., et al., filed Feb. 19, 2014.
Final Office Action dated Jun. 15, 2018, for U.S. Appl. No. 14/461,146, of Kim, M., filed Aug. 15, 2014.
Notice of Allowance dated Sep. 21, 2018, U.S. Appl. No. 14/184,590, of Dorogusker, J., et al., filed Feb. 19, 2014.
Corrected Notice of Allowance dated Oct. 29, 2018, U.S. Appl. No. 14/184,590, of Dorogusker, J., et al., filed Feb. 19, 2014.
Non-Final Office Action dated Nov. 5, 2018, for U.S. Appl. No. 15/166,822, of Botros, P.A., filed May 27, 2016.
Notice of Allowance dated Mar. 22, 2019, for U.S. Appl. No. 15/166,822, of Botros, P.A. et al. filed May 27, 2016.

* cited by examiner

ESTIMATING INTERCHANGE FEES FOR CARD PAYMENTS

BACKGROUND

Point-of-sale (POS) devices are used by merchants to perform transactions using customers' credit cards and other payment instruments. At and/or after the time of a purchase, a purchase transaction is implemented in a process that involves authorization, capture, and settlement of a transaction amount.

For payment instruments such as credit cards and debit cards, the transaction process involves several entities, including an issuing bank, an acquiring bank, and a card payment network. The issuing bank is the bank that issues the payment instrument. The acquiring bank is the bank that accrues merchant funds on behalf of the merchant. The card payment network, sometimes referred to as a card network, coordinates transactions and settlements between the various entities. Visa®, MasterCard®, American Express®, and Discover® are examples of well-known card payment networks.

Generally, each of the entities mentioned above charges a fee for each transaction, and the various fees are passed to the merchant. For example, the payment network may charge a fixed fee for every transaction. As another example, the issuing bank charges what is known as an interchange fee. The amount of the interchange fee is variable as a function of numerous attributes of a transaction.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
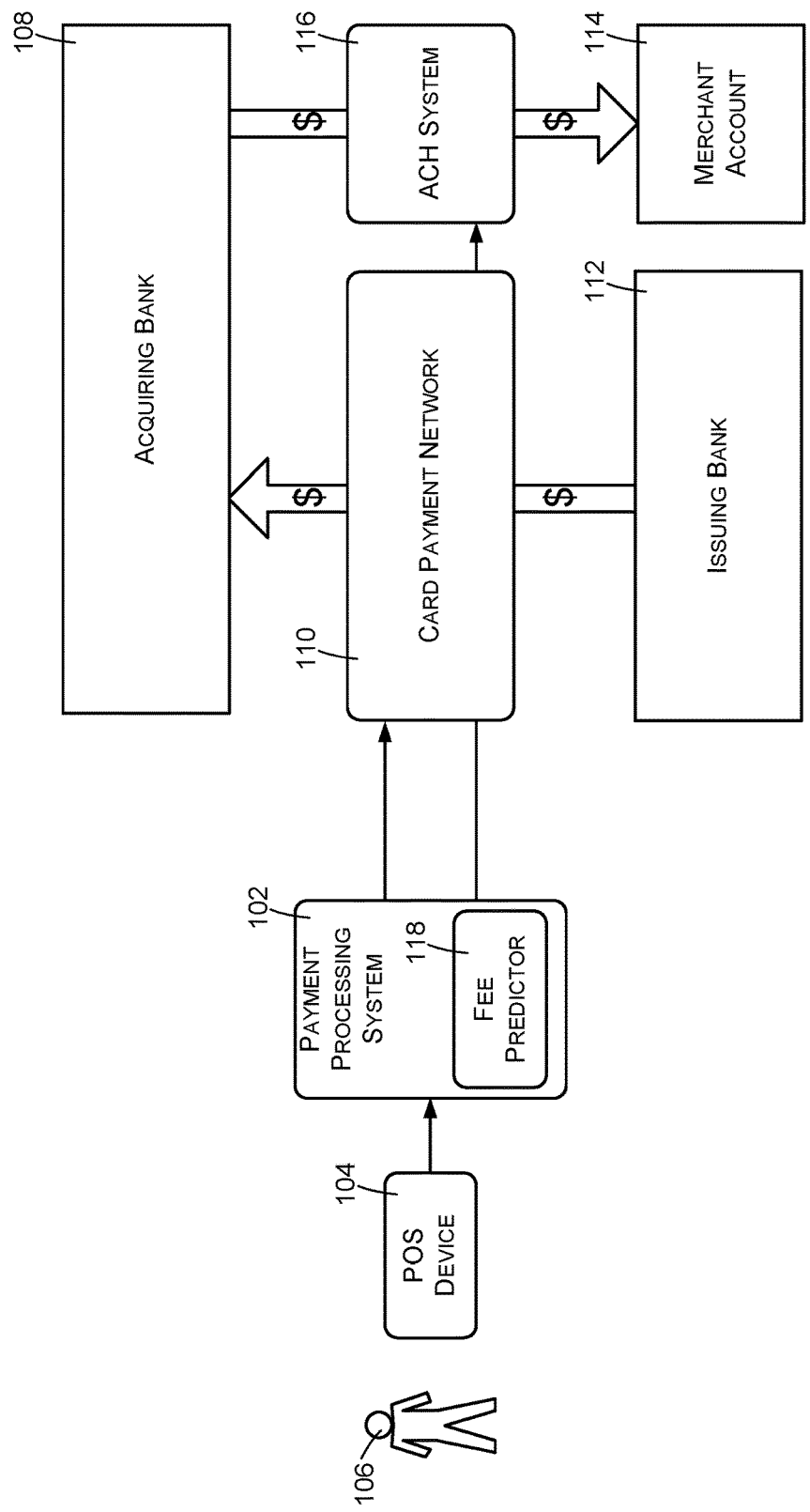
FIG. 1 is a block diagram illustrating an example technique for conducting transactions and for basing payments to merchants on predicted interchange fees.

A payment processing system may be implemented as a network-based service to provide what are sometimes referred to as merchant services. The payment processing system, which may be implemented by a merchant services provider, acts on behalf of a merchant to conduct financial transactions, also referred to herein as payment exchanges, that involve electronic payments based on customer-provided payment instruments. Payment instruments may comprise credit cards, debit cards, gift cards, electronic tokens, and so forth.

A merchant uses a point-of-sale (POS) device to enter purchase information and to accept payment instruments. For each transaction, the POS device sends transaction information to the payment processing system. Among other things, the transaction information includes the transaction amount, also referred to herein as an exchange amount, and an identifier of the payment instrument (such as a credit card number).

Assuming that the transaction is approved, the payment processing system communicates with an associated acquiring bank to initiate a transfer of funds from the issuing bank of the payment instrument to the acquiring bank. A payment network, such as one of the Visa® or MasterCard® card networks, is used to facilitate the transfer. The transaction incurs several fees. For example, the acquiring bank typically charges a fee that has been negotiated with the payment processing system. In addition, the card payment network charges what will be referred to herein as a network fee. The issuing bank also receives a fee, which is referred to as an interchange fee. Finally, the payment processing system itself may receive some type of fee for each transaction.

Some or all of the fees noted above may be passed on to the merchant by deducting them from the transaction amount that is eventually credited to the merchant.

Throughout a business day, the merchant may conduct numerous purchase transactions. Generally, the payment processing system settles these transactions with the merchant sometime after the business day, such as by using an ACH (Automated Clearing House) batch funds transfer. In some situations, a given transaction may be expedited and settled during the same business day, for example by using a debit card network to transfer funds into a merchant account.

Certain of the transaction processing fees noted above may be fixed amounts or fixed percentages of the transaction amount. For example, the payment network fee and the acquiring bank's fee may be fixed at a certain amount or percentage, or calculated using simple formulas. The interchange fee, however, may vary from transaction to transaction, and may depend on numerous factors other than the transaction amount. For example, the interchange fee may be calculated based on information such as the merchant's type of business, whether the transaction is a "card-present" transaction, card brand, region, card type, type of transaction, card entry method, etc.

Although interchange rates are documented, actually calculating the amount of an interchange fee for a given transaction based on the available documentation is complex and difficult, and some of the information used to calculate the amount of the interchange fee may not be readily available or ascertainable to the merchant or to the payment processing system. Instead, the payment processing system may have to rely on reports that are received periodically from the acquiring bank, which show the actual interchange fee for every transaction.

However, the report for a given business day or other reporting period may not be available for some time after the reporting period. The delay between conducting a transaction and receiving a report indicating the interchange fee for the transaction can range from a day to several days. Because of this, the actual amount of the interchange fee for a given transaction is typically not known at the time of settlement with the merchant, which may occur on the same business day that the transaction was conducted.

The delay in receiving reports of actual interchange fee amounts can be a problem in situations where the payment processing system charges merchants based on actual transaction costs. In some cases, this is handled by calculating an average interchange fee that is used for initial merchant settlement, and then performing a monthly reconciliation to correct for differences between the charged fees and the actual fee amounts as documented by the reports that are eventually received from the acquiring banks associated with the payment processing system.

In certain embodiments described herein, the estimated amounts used to initially settle with a merchant are based on a predictive model that has been created using machine learning techniques, based on information regarding past purchase transactions. This can result in more accurate estimates of interchange fees, and therefore may reduce the need for later reconciliations with merchants and/or reduce the amounts involved in the reconciliations.

A predictive model such as this can be used to quickly obtain estimates of interchange fees, and can be useful for other purposes not necessarily related to merchant settlement. For example, a particular payment instrument such as a debit card may be associated with more than one payment network, and the payment processing system may have a choice regarding which payment network to use. The availability of accurately predicted interchange fees may make it possible to compare the interchange fees of the available payment network and to select the payment network having the lowest interchange fee for a given transaction.

Estimated interchange fees may be used for other purposes as well. Several examples follow.

The payment processing system may use estimated interchange fees when creating various types of financial reports, prior to the time at which the actual fees are known. In certain scenarios, reports based on predicted fees may be compared to reports of the acquiring banks to detect anomalies or mistakes in the interchange fees charged to the payment processing system. Reports based on predicted interchange fees may also be used to detect various types of mistakes that may be made by the payment processing system, such as system bugs or algorithmic errors.

The ability to predict the amounts of interchange fees may provide an opportunity to negotiate those fees downward with the payment networks and/or the issuing banks.

The ability to predict the amounts of interchange fees may allow the payment processing system to report transaction costs even when the acquiring banks are unavailable because of maintenance or outages.

Predicted interchange fees may be used as the basis for real-time, per-transaction selection of payment networks, acquiring banks, issuing banks, and possibly other aspects of payment processing, so that the cost of each transaction is reduced or minimized.

The predicted interchange fees may be used to determine the lowest transaction costs by merchant, merchant category code, transaction amount, etc.

The predicted interchange fees may be used by the payment processing network, to analyze new merchants and to build tools for sales personnel to suggest favorable market segments, and to determine likely profitability rates.

The predicted interchange fees may be used to reduce churn by automatically reevaluating and changing fees of the payment processing network for a particular merchant when the merchant's volume gets larger, when the mix of payment instruments used by the merchant's customers changes, or it can be determined from the predicted interchange fees that the fees of the payment processing network are not competitive with other merchant services providers.

Additional details are given below. The foregoing introduction is provided for the reader's convenience and is not intended to limit the scope of the claims. Furthermore, the techniques described above and below may be implemented in a number of ways and in a number of contexts. Although example implementations and contexts are provided with reference to the figures, the described implementations and contexts are but a few of many.

FIG. 1 shows components and entities that may be involved in processing certain types of transactions that are based on payment instruments. The system 100 includes a payment processing system 102 that provides purchase transaction support to businesses. The payment processing system 102, also referred to herein as a payment support system or support system, provides what are sometimes referred to as merchant services, and may be implemented by a merchant services provider.

The payment processing system 102 enables and facilitates payment processing for point-of-sale (POS) transactions and other payment exchanges between entities such as merchants and customers. More specifically, the payment processing system 102 includes payment processing software, hardware, and/or services that enable a merchant to receive payments from customers when conducting financial exchanges with the customers. For example, the payment processing system 102 may enable a merchant to receive credit card payments, debit card payments, mobile payments, and/or different types of electronic payments from customers. The payment processing system may also be used by online merchants to conduct transactions for which customers are not physically present.

The payment processing system 102 interacts with multiple POS computing devices 104, also referred to herein as POS devices 104, which are associated respectively with different merchants 106. The POS devices 104 are used by the merchants 106 and by the payment processing system 102 to process payments for purchase transactions from customers.

Generally, the POS devices 104 may comprise any of various types of devices, such as terminals, computers, registers, portable devices (tablet computers, smartphones, etc.) and so forth. In some cases, the POS devices 104 may incorporate or work in conjunction with card readers for reading credit cards and/or other payment instruments. In some cases, the POS devices 104 may enable mobile payments, such by allowing a customer to use a smartphone or other mobile device to pay for a purchase transaction. More generally, a POS device is configured to receive information from a payment instrument, which may comprise a physical card or an electronic token or data object, and to interact with the payment processing system 102 to facilitate the transfer of funds from the customer to the merchant based on the information from the payment instrument.

Although FIG. 1 shows only a single POS device 104 associated with the merchant 106, each merchant 106 may use multiple POS devices 104 that are part of an integrated POS system. Furthermore, the POS devices 104 of a merchant POS system may be used interchangeably during a purchase transaction. That is, a transaction may be initiated on one POS device 104 and completed on another POS device 104.

The payment processing system 102 may comprise a large-scale service that supports many merchants 106, who may be distributed across large geographic areas. In some cases, the payment processing system 102 may implement POS services and other merchant services through pages of a website that are accessed by the POS device 104 of the merchant 106. In these cases, the POS device 104 may comprise a device such a tablet computer or other portable device that accesses the pages of the web site using an Internet browser. In other cases, tablet computers or other devices may run special-purpose applications that are specifically configured to implement POS services in conjunction with the payment processing system 102, using network APIs (application program interfaces) that are made available by the payment processing system 102.

For a given exchange, a customer may pay for a purchase by providing a payment instrument such as a debit card, a credit card, a stored-value card, a gift card, a check, an electronic token provided by a device carried by the customer, etc. The merchant 106 can interact with the POS device 104 to process the transaction, such as by inputting (e.g., manually, via a magnetic card reader, NFC (near-field communications sensor), RFID (radio frequency identifier) reader, etc.) an identifier associated with the payment instrument. For example, a payment instrument of one of the customers may include one or more magnetic strips for providing card and customer information when swiped in a card reader. In other examples, other types of payment cards may be used, such as smart cards having built-in memory chips, RFID tags, NFC chips, etc. that are read by the POS device 104 when the cards are "dipped" into the reader. The merchant and/or the POS device 104 may also provide other transaction information describing the transaction, such as a transaction amount, the item(s) being purchased, a time, place and date of the transaction, a card payment network associated with the payment instrument, an issuing bank of the payment instrument, and so forth.

The POS device 104 sends the transaction information to the payment processing system 102 over a data communications network (not shown) with instructions to obtain payment of the specified transaction amount. The payment processing system 102 in turn communicates with an acquiring bank 108 to authorize and capture the transaction amount on behalf of the merchant 106.

If the transaction is successfully authorized and/or captured, a card payment network 110, also referred to herein as an exchange processor, transfers money from an issuing bank 112, which is linked to or associated with the payment instrument of the customer, to the acquiring bank 108, which is associated with the payment processing system 102 and/or the provider of the payment processing system 102. This process may be repeated for different merchants, customers, types of payment instruments, card networks, and banks.

The card payment network 110 may comprise a network such as MasterCard®, VISA®, Discover®, American Express®, Star®, etc., as examples.

The acquiring bank 108 has a relationship with the provider of the payment processing system 102 in order to receive funds on behalf of the provider. Specifically, the merchant services provider might have one or more bank accounts with the acquiring bank 108, into which received funds are deposited by transfer from the issuing bank 112.

Although only a single issuing bank 112 is shown in FIG. 1, the card payment network 110 may process numerous transactions using payment instruments associated with many different issuing banks. In addition, the payment processing system 102 may be associated with more than one acquiring bank 108, and each transaction may be completed using any one of multiple acquiring banks. Furthermore, different transactions may be conducted using different card payment networks 110.

Note that the issuing bank 112 may be referred to more generally as an issuer 112, and the acquiring bank 108 may be referred to more generally as an acquirer.

Following one or more transactions conducted by the merchant 106, the payment processing system 102 transfers funds corresponding to the transactions to a merchant bank account 114 that is associated with the merchant 106. Fund transfers from the acquiring bank 108 to the merchant bank account 114 may be performed using an ACH (Automated Clearing House) batch transfer system 116, as an example. ACH is an electronic financial network that processes large volumes of electronic funds transfers in batches, typically overnight. Debit card transfers may also be used for faster disbursements to merchants.

In some cases, the payment processing system 102 may be configured to record authorized and/or captured transaction amounts for the merchant 106 (as well as for other merchants) throughout a business day, and at the end of the business day to submit those transaction amounts as a batch for transfer by the ACH batch transfer system 116 from the acquiring bank 108 to the merchant bank accounts 114 of the merchants 106. The various processing fees described above, including interchange fees, are deducted from the original transaction amounts before this transfer.

In some cases, certain transaction amounts, for certain captured transactions, may be transferred to the merchant using a debit card transfer system (not shown). Assuming that the merchant bank account 114 is linked to a debit card, such a debit card transfer system can be used to perform expedited transfers of funds from the acquiring bank 108 to the merchant bank account 114. Although this may involve additional fees, such fees may at times be justifiable to a merchant in return for receiving quick access to funds, especially for large transactions.

In embodiments described herein, the payment processing system 102 implements a fee predictor 118 that predicts or estimates the fees that will be charged for a particular transaction by one or more entities shown in FIG. 1. In particular, the fee predictor may be configured to predict the amount of the interchange fee and/or other issuer fee amounts for any given transaction. Further details regarding the fee predictor 118 will be discussed below.

Communications between the various components of FIG. 1, such as the POS device 104, the payment processing system 102, the card payment network 110, the issuers 112, the acquirer 108, the ACH batch transfer system 116, and various other entities that may be associated, for example, with the issuing bank 112, the acquiring bank 108, and the merchant bank account 114, may be implemented through a network infrastructure such as the Internet. More generally, communications may utilize local area networks, wide area networks, wired networks, Wi-Fi and other wireless networks, cellular data networks, close-range wireless communications such as Bluetooth®, near field communications (NFC), etc. Protocols for communicating over such networks are well known and will not be discussed herein in detail. Various types of encryption and security techniques may be employed to protect communications from eavesdroppers.

Figure 2:
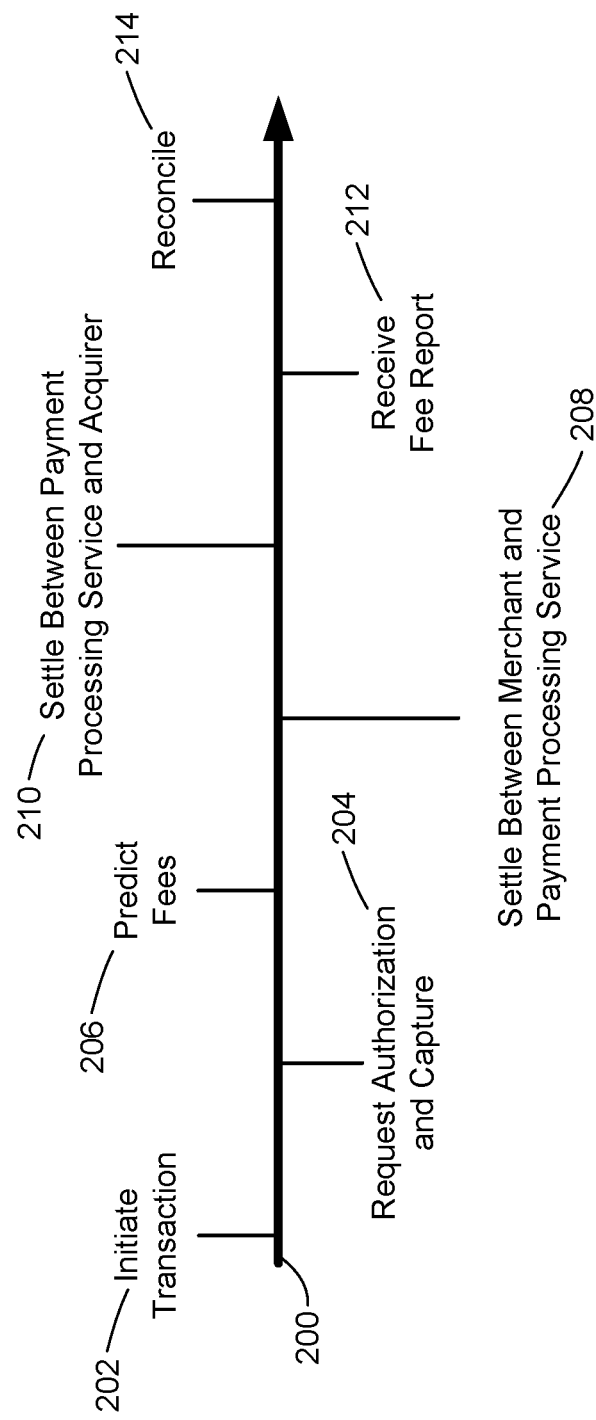
FIG. 2 is a timeline illustrating an example timing of events that may occur in the environment of FIG. 1.

FIG. 2 shows an example timeline 200 that illustrates relative timings of various events involved in processing an example transaction. The timeline 202 represents elapsed time, increasing from left to right. Events are shown in their relative order. However, FIG. 2 is not intended to indicate any particular length of time that might occur between any two events. Furthermore, the order of some events may at times be different than shown in FIG. 2.

At 202, the POS device 104 is used to initiate a transaction. For example, the merchant 106 may interact with the POS device 104 to provide transaction information for a purchase or other payment exchange. For purposes of discussing events shown in FIG. 2, this transaction will be referred to as the example transaction or the example exchange. The provided transaction information, also referred to as exchange information, may include specification of a payment instrument and a transaction or exchange amount, among other things.

Authorization and capture of the transaction amount is performed at 204, using a particular card payment network 110, the issuer 112 of the payment instrument, and the acquirer 108. In some situations, authorization and capture may be decoupled, and capture may occur much later than authorization. For example, in some environments, multiple transactions for a business day may be captured as a group at the end of the business day.

At 206, sometime after the authorization and capture 204, the payment processing system 102 uses the fee predictor 118 to estimate a predicted amount of the fees, including the interchange fee, that will be charged in conjunction with the example transaction. A technique for estimating predicted fee amounts will be described below. Note that in some situations or embodiments, the fee prediction 206 may be performed prior to the authorization and capture 204. In other situations or embodiments, the fee prediction 206 may occur subsequent to authorization but prior to capture. In yet other situations or embodiments, the fee prediction 206 may occur subsequent to capture of the example transaction.

At 208, sometime after the fee prediction 206, the payment processing system 102 settles with the merchant 114. In some embodiments or situations, the merchant settlement 208 may be performed immediately or as soon as possible after the end of the business day, may be for transactions that occurred during the business day, and may include the example transaction. In this case, the merchant settlement 208 may comprise a batch payment that is made sometime after the end of the business day, such as overnight or within 24 hours following the business day. In some embodiments or situations, the settlement for the example transaction may occur immediately or as soon as possible after the fee prediction 206, which may itself occur immediately after authorization or capture of the example transaction.

In certain embodiments, the transaction costs of the payment processing system 102, as well as an additional service fee imposed by the payment processing system 102, are passed on to the merchant on a per-transaction basis, by deducting the costs and the service fee from each transaction amount before merchant settlement. Costs that are deducted include the acquirer fee, the predicted interchange fee amount, and the network fee amount of the card payment network 110.

At 210, a settlement is performed between the acquirer 108 and the payment processing system 102. For purposes of discussion, it is assumed that the settlement 210 includes the example transaction. The settlement 210 between the acquirer 108 and the payment processing system 102, for transactions occurring in a particular business day, may occur as a batch during the subsequent 24 hours. However, settlement may take longer in some environments. Generally, the settlement 210 between the acquirer 108 and the payment processing system 102 may be either before or after the settlement 208 between the payment processing system 102 and the merchant 106.

At 212, the payment processing system 102 receives a fee report, indicating the various fees, including interchange fees, that were incurred for a group of transactions that include the example transaction. The fee report is typically received from the acquirer 108. In this example the fee report is received after the merchant settlement 208 that included settlement of the example transaction with the merchant 106. The delay in receiving the fee report and the frequency at which the report is provided varies, depending on the practices of the acquirer 108.

At 214, after receiving the fee report, the payment processing system 102 performs an account reconciliation with the merchant 106 to account for any differences between predicted interchange fee amounts that were charged to the merchant during initial settlement with the merchant, and actual interchange fee amounts. In some embodiments, the reconciliation 214 may be performed periodically, such monthly, and may account for the transactions and settlements of an earlier period. If aggregated actual fees were greater than the aggregated predicted fees that were initially charged to the merchant, the payment processing system 102 charges the difference to the merchant 106. If the aggregated actual fees were less than the aggregated predicted fees, the payment processing system 102 issues the difference as a credit to the merchant 106.

Figure 3:
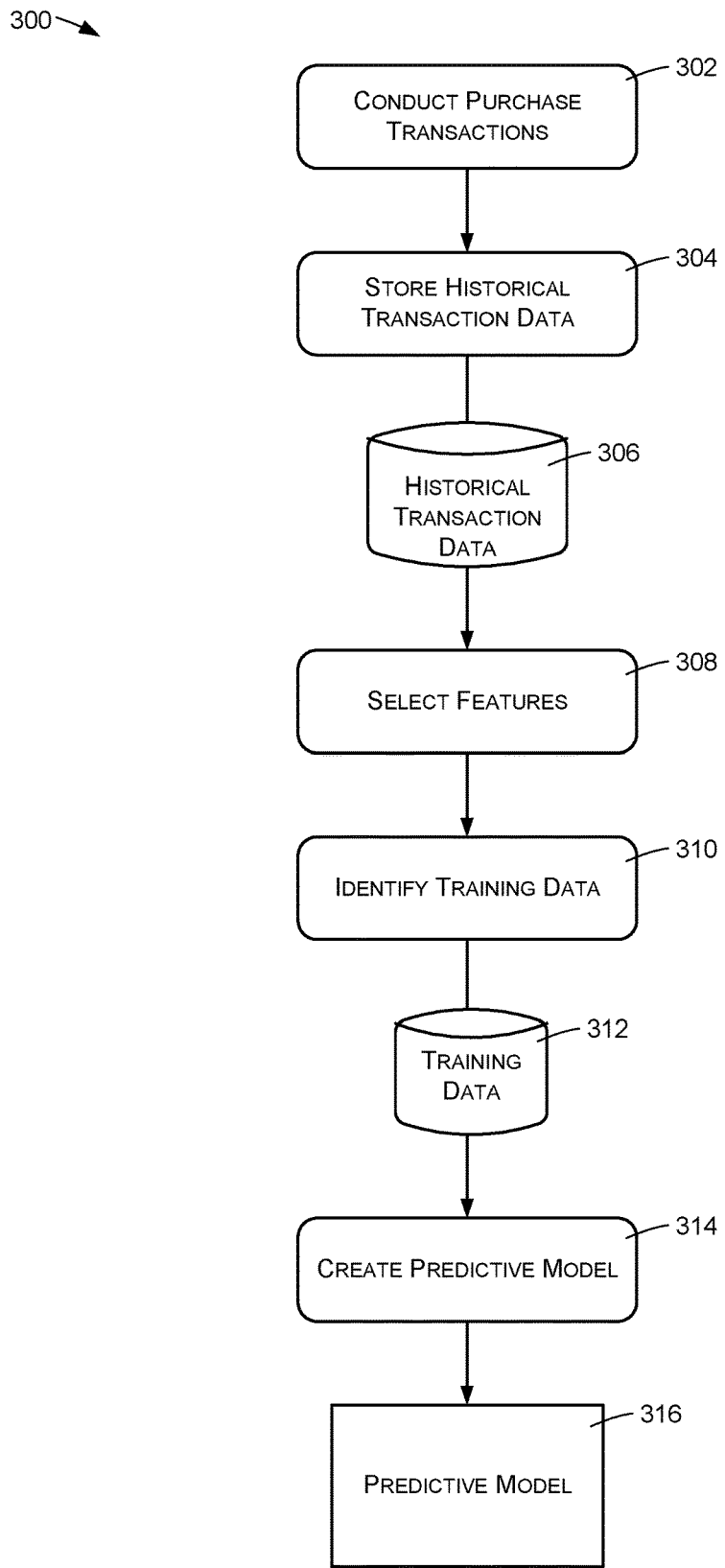
FIG. 3 is a flow diagram illustrating an example method of creating a predictive model for estimating interchange fees.
Figure 4:
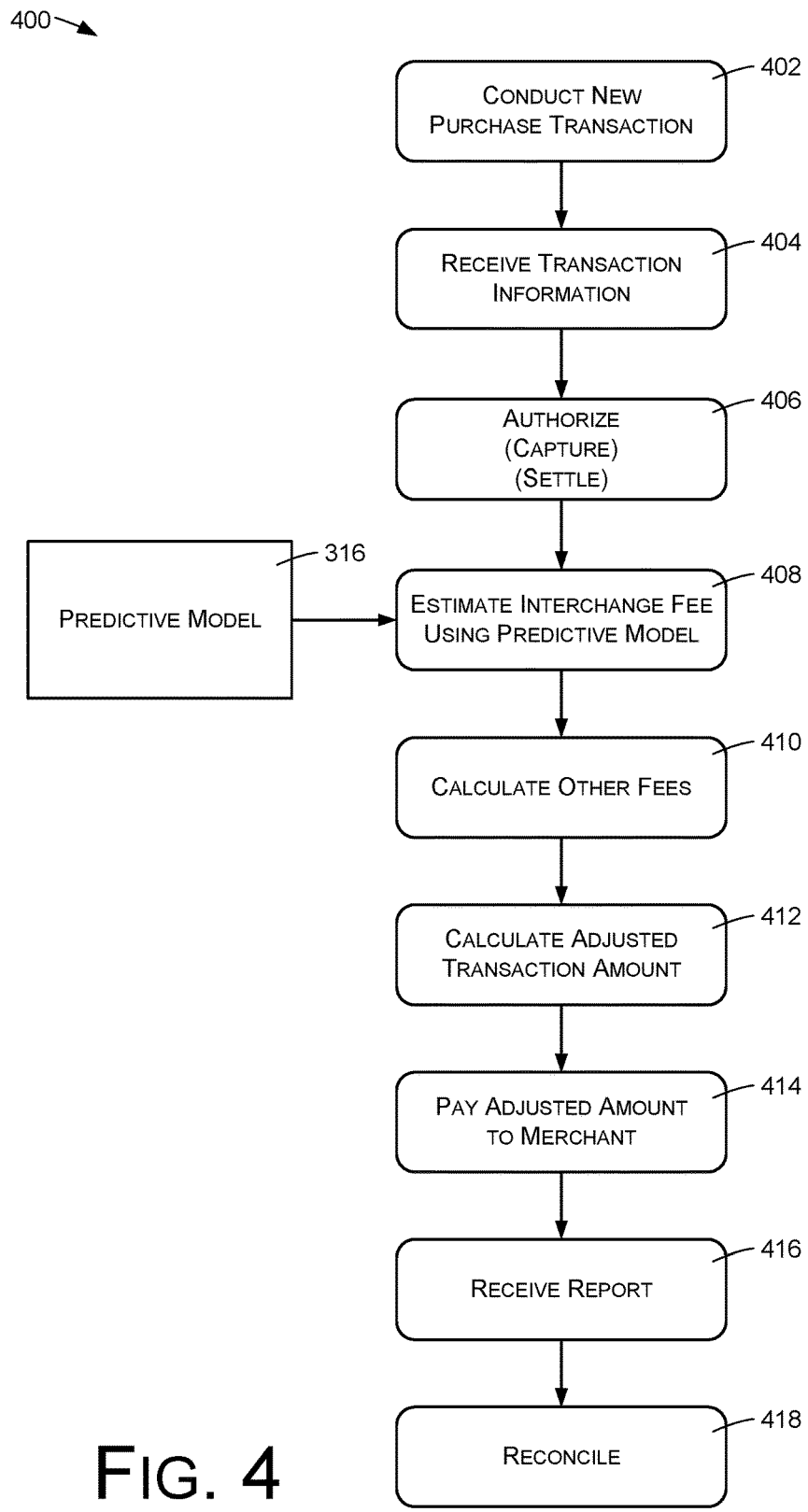
FIG. 4 is a flow diagram illustrating an example method of conducting transactions and paying merchants based on predicted interchange fees.

FIGS. 3 and 4 illustrate portions of an example method for predicting interchange fees and/or other transaction processing fees that may be involved in an example purchase transaction, and for accounting for the predicted fees during initial merchant settlement. In particular, FIG. 3 shows an example method 300 of creating a predictive model that can be used at a later time to predict the transaction processing fees. FIG. 4 shows an example method 400 of determining predicted transaction processing fees using the predictive model, and using the predicted fees when settling between a payment processing system and a merchant.

In certain embodiments, the predictive model is used by the payment processing system 102 to estimate interchange fees of issuing banks, although it can also be used to estimate other fees, including the amount of cumulative fees that are likely to be incurred in a particular transaction. Although the method 300 is described with reference to the environment shown in FIG. 1, the method 300 may also be used in other environments and using other architectures, and the various actions described with reference to FIG. 3 may be performed by any of various entities or devices that may be present in any particular embodiment or environment.

An action 302 comprises conducting purchase transactions between the merchant 106 and customers using the POS computing device 104. This comprises, in part, the POS computing device 104 accepting payment instruments to initiate purchase transactions. The action 302 also comprises the payment processing system 102 receiving certain transaction information regarding the purchase transactions from the POS device 104.

For each purchase transaction, the transaction information indicates a transaction amount and a payment instrument identifier such as a card number. Transaction information may also indicate tip amounts, the types of goods involved in the purchase transaction, the prices for individual products involved in the purchase transaction, etc.

The action 302 may include communicating with the card payment network 110 to initiate payments for the purchase transactions from issuers 112 of the payment instruments to the one or more acquirers 108 that are associated with the payment processing system 102. For each transaction, the issuer 112 associated with the payment instrument receives an interchange fee. Each transaction may also incur a fee from the acquirer and a network fee from the card payment network.

An action 304, performed by the payment processing system 102, comprises storing historical transaction data 306, representing historical information corresponding to the purchase transactions conducted in the action 302. For each purchase transaction, the stored historical transaction data 306 includes data regarding multiple attributes of the purchase transaction, including the transaction amount, the payment instrument identifier, a merchant category code (MCC), etc.

An action 308 comprises selecting which attributes of purchase transactions are to be used in predicting interchange fees associated with the purchase transactions. In the context of machine learning, these attributes are referred to as features. The set of features that are selected for use in interchange fee prediction will be referred to herein as the transaction features. In an example embodiment, the transaction features for a purchase transaction may include any of the following: . . .

- the bank identification number (BIN) of the payment instrument used for the purchase transaction;
- the amount of the purchase transaction;
- the merchant category code (MCC) of the merchant conducting the transaction;
- the type of the payment instrument, such as credit, unregulated debit, or regulated debit;
- whether the purchase transaction was a card-present transaction, i.e., whether the payment instrument was present for the purchase transaction;
- the tip amount of the transaction;
- the ratio of the tip amount to the transaction amount;
- the method of entering the payment instrument, such as by "swipe" or manual entry;
- the payment gateway associated with the payment instrument;
- whether the transaction is for a prepayment;
- the payment instrument brand, such as MasterCard®, Visa®, Discover®, etc.;
- an identifier of the issuing bank of the payment instrument;
- whether the payment instrument was issued by a United States bank;
- whether the payment instrument was issued by a bank within a United States territory;
- the country of the bank that issued the payment instrument;
- the subcategory of the payment instrument, such whether the payment instrument is a signature card, a reward card, a corporate card, a fleet card, etc.
- whether the payment instrument is a Flexible Spending Account (FSA) debit card;
- whether the payment instrument is a Health Savings Account (HAS) debit card;
- the merchant account number of the payment processing system with the payment gateway; and
- the percentage of past transactions having the BIN of the payment instrument that incurred non-fraud regulated charges.

Note that the transaction features are not limited to those listed above, and that other features may also be relevant to interchange prediction and may be used in certain embodiments. Generally, the transaction features include information that is available to the payment processing system 102 and that the card payment networks 110 and/or issuing banks 112 may use to calculate interchange fees. Values for the transaction features may be provided by the POS device 104, may be derived from information provided by the POS device, or may be known to the payment processing system 102. Similarly, values for some transaction features may be stored in the historical transaction data 306 while other features may be calculated, derived, or obtained based on information stored in the historical transaction data 306.

An action 310, performed by the payment processing system 102, comprises identifying training data 312 corresponding to historical purchase transactions. The training data 312 includes values of the transaction features for each of multiple historical purchase transactions, which may be obtained at least in part from the historical transaction data 306.

An action 314, performed by the payment processing system 102, comprises analyzing historical information regarding past purchase transactions to determine a relationship between historical information regarding purchase transactions and the respectively corresponding interchange fees. In certain embodiments, this may comprise analyzing the training data 312 using machine learning techniques to create a predictive model 316.

Generally, machine learning involves finding and quantifying a relationship between feature values and a dependent variable, such that the relationship can be used to predict the value of the dependent variable given a set of feature values. In this case, the dependent variable is the interchange fee and the predictive model is generated so as to estimate or predict the interchange fee that will be charged for a given transaction based on the transaction information and/or transaction feature values associated with the transaction.

In certain embodiments, a method or analytic tool referred to as a Random Forest Regressor may be used to generate a regression tree based on the training data 310. The regression tree may be used at a later time to predict the interchange fee for a given transaction based on the feature values of that transaction. In these embodiments, the predictive model 316 may therefore comprise such a regression tree. When feature values corresponding to a particular transaction are used as inputs, the regression tree produces an output value corresponding to an estimated or predicted amount of a corresponding interchange fee for the particular transaction.

The method 300 may be repeated periodically to update the predictive model 316. For example, the predictive model 316 may be updated every week or every month, based on relatively new training data.

FIG. 4 shows an example method 400 for processing purchase transactions and for paying merchants based on transaction fees that have been calculated using the predictive model 316 described above. Although the method 400 is described with reference to the environment shown in FIG. 1, the method 400 may also be used in other environments and using other architectures, and the various actions described with reference to FIG. 4 may be performed by any of various entities or devices that may be present in any particular embodiment.

An action 402 comprises initiating and conducting a new purchase transaction using the merchant POS device 104. The new purchase transaction may be initiated and completed in the usual manner, such as by scanning, swiping, or otherwise reading a payment instrument, entering a transaction amount, etc.

An action 404, performed by computers of the payment processing system 102, comprises receiving transaction information corresponding to the purchase transaction from the merchant POS device 104. The transaction information may indicate various information, including the transaction amount and an identifier, such as a card number, of the payment instrument being used for payment. The transaction information may also indicate values corresponding to the one or more of the transaction features described above. In some cases, the transaction information may indicate information from which the transaction feature values can be derived.

An action 406, performed by computers of the payment processing system 102, comprises requesting the acquirer 108 to authorize payment of the transaction amount by the issuing bank 112 to the acquiring bank 108. This interaction is referred to as authorization. The action 406 may include or may be followed at some point by the additional capture and settlement interactions that are part of the typical operations of the card payment network 110. Capture and settlement may be performed at any time after the authorization 406, independently of the subsequent actions that are shown as following the action 406 in FIG. 4. More generally, such subsequent actions may in various embodiments or situations be performed at any time relative to authorization, capture, or settlement, including before authorization, after authorization, or in conjunction with authorization.

An action 408, performed by computers of the payment processing system 102, comprises analyzing the transaction information based on the relationship determined by the method 300 of FIG. 3 to determine a predicted interchange fee amount for the new purchase transaction. More specifically, in certain embodiments the action 408 may be performed by the fee predictor 118, and may comprise using the predictive model 316 to determine the predicted interchange fee amount for the new purchase transaction. The action 408 may, for example, comprise following branches of a regression tree using the feature values of the transaction to ultimately calculate the predicted interchange fee. Examples of feature values are enumerated above in conjunction with the discussion of FIG. 3.

Some of the feature set values for the new purchase transaction may be specified or explicitly indicated by the information received from the POS device 104. Additional feature set values may be derived from the information received from the POS device 104 or obtained by referencing the information received from the POS device 104. Some of the feature set values may be known to the payment processing system 102 independently of information received from the POS device 104, such as feature set values relating to attributes of the merchant 106.

An action 410, performed by computers of the of the payment processing system 102, comprises calculating or otherwise determining additional transaction processing fees, other than and in addition to the interchange fee, that will be incurred as part of the new purchase transaction. Such additional transaction processing fees may include fees by the acquirer 108 as well as assessments and other miscellaneous network fees imposed by the by the card payment network 110. These additional fees are typically based on known formulas and can often be calculated directly using known information such as the amount of the transaction.

Note that in some cases, the predictive model 316 may be trained and used to estimate fees in addition to the interchange fee, such as fees of acquiring banks and card payment networks. In some implementations, the predictive model 316 may be trained and used to estimate the aggregate fees incurred in a transaction, which might include interchange fees as well as the fees of acquiring banks and card payment networks.

An action 412 comprises calculating an adjusted amount for the new purchase transaction, wherein the adjusted amount comprises the transaction amount of the new purchase transaction minus one or more processing fees, and wherein the one or more processing fees include the predicted interchange fee amount.

An action 414 comprises paying or crediting the adjusted amount to the merchant In some embodiments, this may comprise initiating a batch transfer to the merchant after the end of a given business day and before receiving an indication of an actual interchange fee amount for the new purchase transaction. For example, the batch payment may be initiated prior to the business day that immediately follows the business day during which the new transaction occurred. The batch payment may be for adjusted amounts of multiple purchase transactions that occurred during the preceding business day, where the multiple purchase transactions include the new purchase transaction. The batch payment can be initiated before receiving a report that indicates actual interchange fee amounts, and may be based instead on predicted interchange fee amounts.

An action 416 comprises receiving one or more reports from one or more acquiring banks 108, indicating actual interchange fee amounts corresponding to multiple purchase transactions conducted during a preceding period, wherein the multiple purchase transactions include the new purchase transaction referred to above. These reports may be in various formats, depending on the acquiring bank 108 and on the payment networks 110 that are used to complete the transactions.

An action 418 comprises performing a reconciliation with the merchant after the end of a predetermined time period. For example, reconciliation may be performed periodically such as every month. The reconciliation comprises determining differences between the predicted processing amounts, which were the basis for the earlier merchant settlement and were determined using predictive modeling, and the actual processing fees as enumerated in the reports received in the action 416. The net of these differences is calculated and a credit or debit is issued to the merchant to correct for the differences.

The techniques described above for estimating interchange fees can be used for things other than merchant settlements. For example, the payment processing system 102 may use predicted interchange fees as the basis for various types of internal and external reports. As another example, predicted interchange fees may be used to find the least expensive way of processing a particular purchase transaction. As yet another example, predicted interchange fees may be used to determine abnormalities in fee calculations by the payment processing system or its acquirers, which may result from mistakes or errors in fee calculations.

Figure 5:
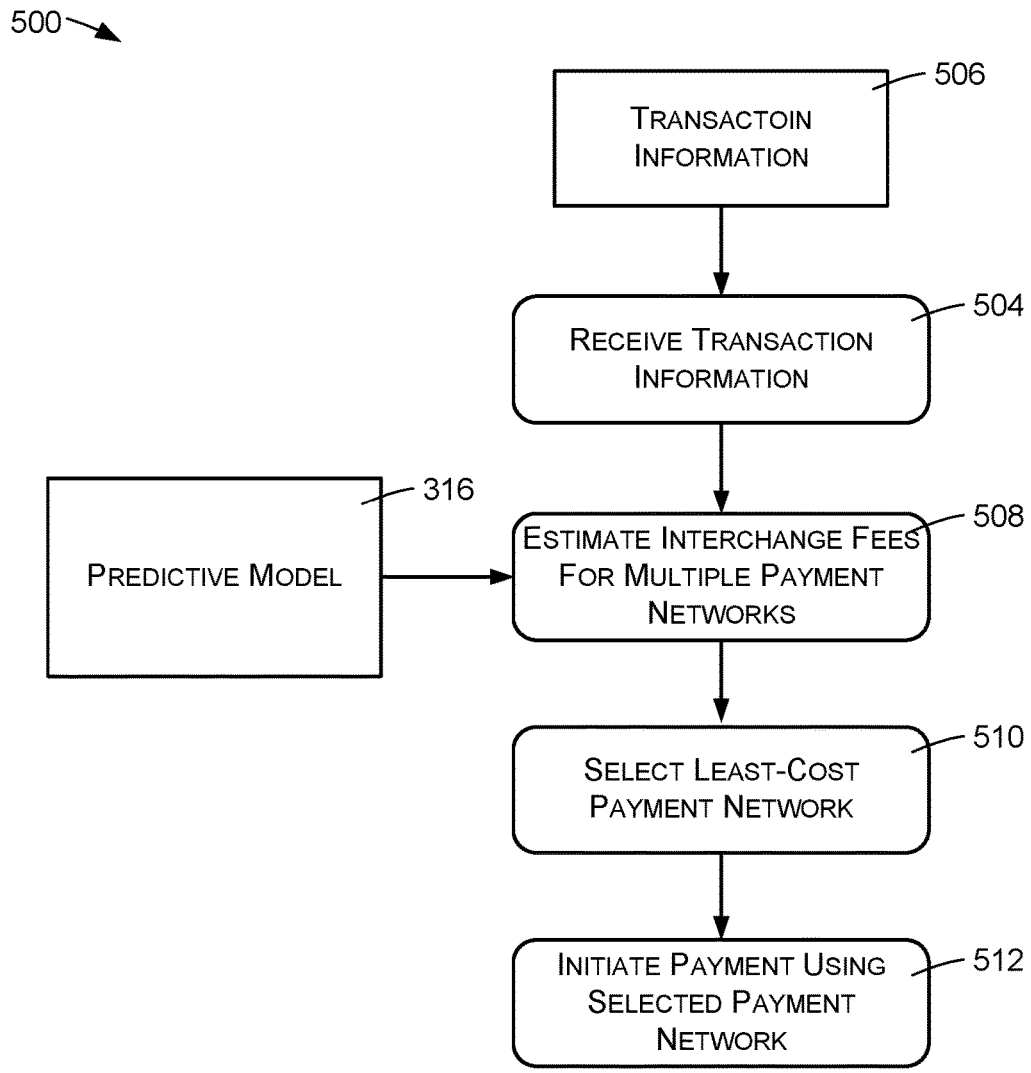
FIG. 5 is a flow diagram illustrating an example method of conducting transactions and of selecting from multiple payment networks based at least in part on predicted interchange fees that will be incurred by using any of the multiple payment networks.

FIG. 5 illustrates an example method 500 that uses predicted interchange fees as part of the basis of a decision regarding which of multiple available payment networks will be used to conduct an individual purchase transaction. The method 500 may be used in certain situations in which a payment instrument is associated with more than one card payment network. In particular, debit cards are typically associated with at least two payment networks. In some cases, particularly in the case of unregulated issuing banks, the interchange fee for a particular transaction may vary depending on which of the available payment networks is used for processing the transaction, and it may be desirable for both the merchant and the payment processing system to use the payment network that will result in the lowest interchange fee.

Although the method 500 is described with reference to the environment shown in FIG. 1, the method 500 may also be used in other environments and using other architectures, and the various actions described with reference to FIG. 5 may be performed by any of various entities or devices that may be present in any particular embodiment.

An action 502 comprises receiving transaction information 506 for a proposed purchase transaction from the merchant POS device 104. The transaction information may indicate various information, including the transaction amount and an identifier of the payment instrument being used for payment. Generally, the transaction information may indicate values corresponding to the one or more of the multiple features listed above.

Prior to authorization of the proposed purchase transaction, the payment processing system performs an action 508 of determining predicted fees, including interchange fees, that will be charged by each of multiple payment networks and/or payment gateways that are associated with the payment instrument identified by the transaction information. Payment networks and payment gateways are referred to collectively herein as transaction processors or exchange processors.

The predicted interchange fees may be determined by using the predictive model 316. In particular, for each available exchange processor, the action 508 may comprise following branches of a regression tree using the feature values of the transaction, to ultimately calculate the predicted interchange fee or other fees.

An action 510 comprises selecting one of the multiple exchange processors associated with the payment instrument, based at least in part on the predicted interchange fee amounts of the multiple exchange processors. Specifically, the action 510 comprises selecting the exchange processor with the lowest predicted transaction processing fees, wherein the predicted transaction processing fees include interchange fees.

An action 512 comprises initiating payment using the selected exchange processor. For example, the action 512 may comprise initiating an authorization for the new purchase transaction and a subsequent capture to initiate a funds transfer for the transaction amount to an acquirer associated with the payment processing system 102.

Figure 6:
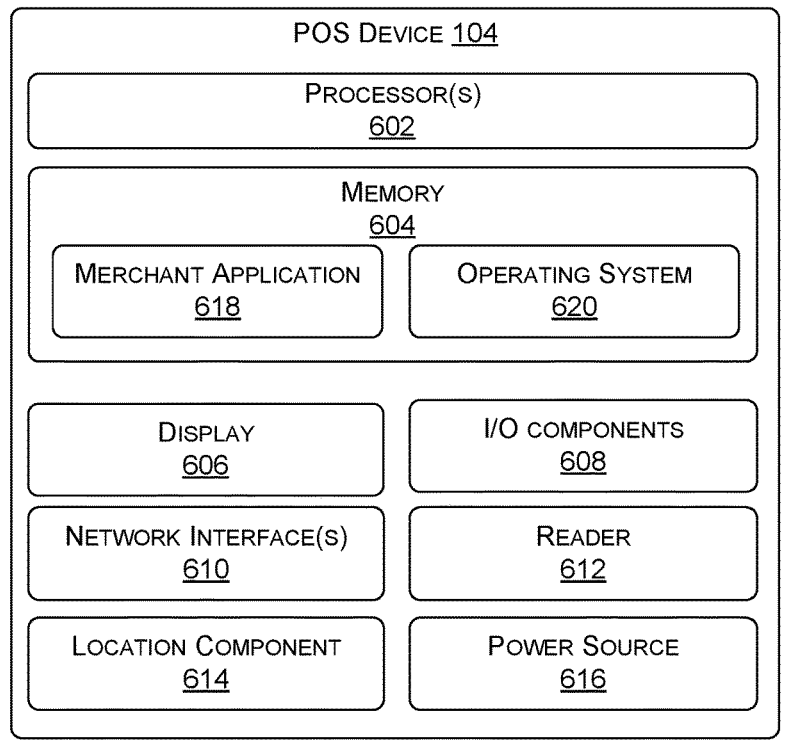
FIG. 6 is a block diagram of an example merchant point-of-sale device.

FIG. 6 illustrates select components of an example POS device 104 according to some implementations. The POS device 104 may be any suitable type of computing device, e.g., mobile, semi-mobile, semi-stationary, or stationary. Some examples of the POS device 104 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the POS device 104 includes at least one processor 602, memory 604, a display 606, one or more input/output (I/O) components 608, one or more network interfaces 610, at least one card reader 612, at least one location component 614, and at least one power source 616.

Each processor 602 may itself comprise one or more processors or processing cores. For example, the processor 602 can be implemented as one or more microprocessors, microcomputers, microcontrollers, digital signal processors, central processing units, state machines, logic circuitries, and/or any devices that manipulate signals based on operational instructions. In some cases, the processor 602 may be one or more hardware processors and/or logic circuits of any suitable type specifically programmed or configured to execute the algorithms and processes described herein. The processor 602 can be configured to fetch and execute computer-readable processor-executable instructions stored in the memory 604.

Depending on the configuration of the POS device 104, the memory 604 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 604 may include, but is not limited to, RAM, ROM, EEPROM, flash memory, solid-state storage, magnetic disk storage, optical storage, and/or other computer-readable media technology. Further, in some cases, the POS device 104 may access external storage, such as RAID storage systems, storage arrays, network attached storage, storage area networks, cloud storage, or any other medium that can be used to store information and that can be accessed by the processor 602 directly or through another computing device or network. Accordingly, the memory 604 may be computer storage media able to store instructions, modules or components that may be executed by the processor 602. Further, when mentioned, non-transitory computer-readable media exclude media such as energy, carrier signals, electromagnetic waves, and signals per se.

The memory 604 may be used to store and maintain any number of functional components that are executable by the processor 602. In some implementations, these functional components comprise instructions or programs that are executable by the processor 602 and that, when executed, implement operational logic for performing the actions and services attributed above to the POS device 104. Functional components of the POS device 104 stored in the memory 604 may include a merchant application 618, which may present an interface on the POS device 104 to enable the merchant to conduct transactions, receive payments, and so forth, as well as communicating with the payment processing system 102 for processing payments and sending transaction information. Further, the merchant application 618 may present an interface to enable the merchant to manage the merchant's account, and the like.

Additional functional components may include an operating system 620 for controlling and managing various functions of the POS device 104 and for enabling basic user interactions with the POS device 104.

In addition, the memory 604 may also store data, data structures and the like, that are used by the functional components. For example, this data may include item information that includes information about the items offered by the merchant, which may include images of the items, descriptions of the items, prices of the items, and so forth. Depending on the type of the POS device 104, the memory 604 may also optionally include other functional components and data, which may include programs, drivers, etc., and the data used or generated by the functional components. Further, the POS device 104 may include many other logical, programmatic and physical components, of which those described are merely examples that are related to the discussion herein.

The network interface(s) 610 may include one or more interfaces and hardware components for enabling communication with various other devices over a network or directly. For example, network interface(s) 610 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The I/O components 608 may include speakers, a microphone, a camera, various user controls (e.g., buttons, a joystick, a keyboard, a keypad, etc.), and/or a haptic output device, and so forth.

In addition, the POS device 104 may include or may be connectable to a payment instrument reader 612. In some examples, the reader 612 may plug in to a port in the POS device 104, such as a microphone/headphone port, a data port, or other suitable port. In other instances, the reader 612 is integral with the POS device 104. The reader 612 may include a read head for reading a magnetic strip of a payment card, and further may include encryption technology for encrypting the information read from the magnetic strip. Alternatively, numerous other types of card readers may be employed with the POS devices 104 herein, depending on the type and configuration of a particular POS device 104.

The location component 614 may include a GPS device able to indicate location information, or the location component 614 may comprise any other location-based sensor. The POS device 104 may also include one or more additional sensors (not shown), such as an accelerometer, gyroscope, compass, proximity sensor, and the like. Additionally, the POS device 104 may include various other components that are not shown, examples of which include removable storage, a power control unit, and so forth.

Figure 7:
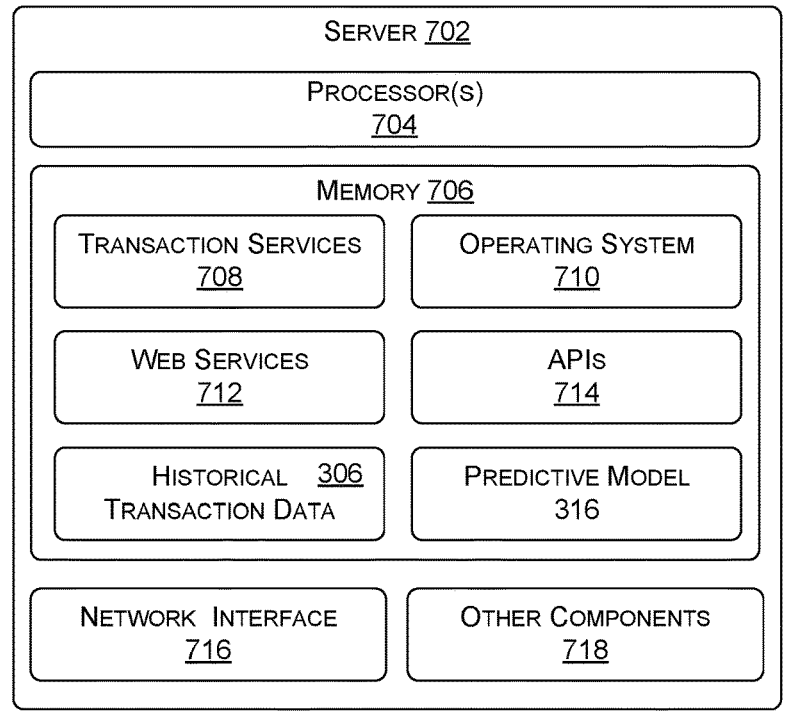
FIG. 7 is a block diagram of an example server that may be used to implement the payment processing system described herein.

FIG. 7 shows an example of a computing device 702, which may be used to implement the functionality of the payment processing system 102 as described herein. Generally, the payment processing system 102 may be implemented by a plurality of servers 702.

In the illustrated example, the computing device 702 includes at least one processor 704 and associated memory 706. Each processor 704 may itself comprise one or more processors or processing cores. For example, the processor 704 can be implemented as one or more microprocessors, microcomputers, microcontrollers, digital signal processors, central processing units, state machines, logic circuitries, and/or any devices that manipulate signals based on operational instructions. In some cases, the processor 704 may be one or more hardware processors and/or logic circuits of any suitable type specifically programmed or configured to execute the algorithms and processes described herein. The processor 704 can be configured to fetch and execute computer-readable processor-executable instructions stored in the memory 706.

Depending on the configuration of the computing device 702, the memory 706 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 706 may include, but is not limited to, RAM, ROM, EEPROM, flash memory, solid-state storage, magnetic disk storage, optical storage, and/or other computer-readable media technology. Further, in some cases, the computing device 702 may access external storage, such as RAID storage systems, storage arrays, network attached storage, storage area networks, cloud storage, or any other medium that can be used to store information and that can be accessed by the processor 704 directly or through another computing device or network. Accordingly, the memory 706 may be computer storage media able to store instructions, modules or components that may be executed by the processor 704. Further, when mentioned, non-transitory computer-readable media exclude media such as energy, carrier signals, electromagnetic waves, and signals per se.

The memory 706 may be used to store and maintain any number of functional components that are executable by the processor 704. In some implementations, these functional components comprise instructions or programs that are executable by the processor 704 and that, when executed, implement operational logic for performing the actions and services attributed above to the payment processing system 102. Functional components stored in the memory 706 may include a transaction services component 708 that receives, processes and responds to transaction requests in accordance with the preceding discussion.

Additional functional components may include an operating system 710 and a web services component 712. The memory 706 may also store APIs (application programming interfaces) 714 that are used for communications between the computing device 702 and the POS devices 104. The memory 706 may also store data, data structures and the like, that are used by the functional components.

In the embodiments described herein, the memory 706 may also be used to store the historical transaction data 306 and the predictive model 316.

The computing device 702 may have a network communications interface 716, such as an Ethernet communications interface, which provides communication by the computing device 702 with other servers, with the Internet, and ultimately with the POS devices 104.

The computing device 702 may of course include many other logical, programmatic, and physical components 718 that are not specifically described herein.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
receiving, via a device associated with a merchant, payment instruments to initiate exchanges, the device executing an instance of a merchant application installed for configuring the device as a point-of-sale (POS) terminal, the POS terminal configured to send first exchange information and second exchange information associated with the exchanges over a network to a support system;
receiving, by one or more computers of the support system, the first exchange information regarding the exchanges from the POS device, the first exchange information indicating exchange amounts and instrument identifiers associated with the exchanges, and wherein the payment instruments are issued by one or more issuers that receive issuer amounts;

determining a transaction feature value based at least in part on the first exchange information;

identifying, by the one or more computers of the support system, training data corresponding to the exchanges, the training data indicating, for each of the exchanges:
a first exchange amount;
a first instrument identifier, and one or more of:
  a category code of an entity that conducted the exchange;
  an amount of the exchange; or
  a type of payment instrument used in the exchange;

creating a predictive model based at least in part on analyzing, by the one or more computers of the support system, the transaction feature value and the training data, the predictive model identifying first predicted issuer amounts associated with the exchanges;

receiving, by the one or more computers of the support system, the second exchange information, wherein the second exchange information is associated with a new exchange from the POS device, and wherein the second exchange information indicates a second exchange amount and a second instrument identifier used in the new exchange;

requesting, by the one or more computers of the support system, authorization to transfer the second exchange amount from an issuer of the payment instrument to an acquirer associated with the support system;

analyzing, by the one or more computers of the support system and using the predictive model, the second exchange information to determine a second predicted issuer amount of the new exchange;

calculating, by the one or more computers of the support system, an adjusted amount for the new exchange, wherein the adjusted amount comprises the second exchange amount minus one or more processing amounts, and wherein the one or more processing amounts include the second predicted issuer amount; and initiating, by the one or more computers of the support system and prior to receiving an indication of an actual issuer amount for the new exchange, a batch fund transfer to an entity that conducted the new exchange, wherein the batch fund transfer is for adjusted amounts of multiple ones of the exchanges that occurred during a previous time period, and wherein the multiple ones of the exchanges include the new exchange.

2. The method of claim 1, wherein analyzing the transaction feature value and the training data comprises using machine learning.

3. The method of claim 1, further comprising:
receiving, from the acquirer, a report indicating issuer amounts corresponding to the multiple ones of the exchanges; and
wherein initiating the batch fund transfer is performed prior to receiving the report.

4. The method of claim 1, the training data further indicating, for at least one of the exchanges, at least one of:
an identification number of the payment instrument;
a tip amount;
a ratio of the tip amount to the amount of the at least one of the exchanges;
whether a past exchange was a card-present exchange;
a country of the issuer of the payment instrument;
a method of entering the payment instrument;
a gateway associated with the payment instrument;
a subcategory of the payment instrument;
a brand of the payment instrument; or
an identifier of the issuing bank of the payment instrument.

5. A system associated with a payment processing service, comprising:
one or more processors; and
one or more non-transitory computer-readable media storing instructions executable by the one or more processors, wherein the instructions program the one or more processors to perform acts comprising:
receiving, via one or more point-of-sale (POS) devices, exchange data associated with exchanges using payment instruments of one or more issuers, wherein a POS device of the one or more POS devices comprises a computing device that has installed thereon an instance of a merchant application that configures the computing device to receive the exchange data and transmit the exchange data to the payment processing service;
identifying training data corresponding to the exchanges, wherein the training data includes historical information, determined based at least in part on the exchange data, associated with the exchanges;
determining a transaction feature value based at least in part on the historical information;
creating a predictive model based at least in part on analyzing the training data and the transaction feature value, the predictive model identifying first predicted issuer amounts associated with the exchanges;
receiving, via the POS device, information regarding a new exchange, wherein the information indicates an amount of the new exchange;
analyzing, using the predictive model, the information to determine a second predicted issuer amount for the new exchange;
calculating an adjusted amount for the new exchange, wherein the adjusted amount comprises the amount minus one or more processing amounts, and wherein the one or more processing amounts include the second predicted issuer amount; and
crediting the adjusted amount to an entity that conducted the new exchange.

6. The system of claim 5, wherein determining the transaction feature value includes determining at least one of a bank identification number (BIN) of the payment instrument, a purchase transaction amount, a merchant category code (MCC), a payment instrument type, a tip amount, a ratio between a tip amount and the purchase transaction amount, a payment method, a payment gateway associated with the payment instrument, whether the transaction is a prepayment, a payment instrument brand, a payment instrument nationality, a sub-category of the payment instrument, whether the payment instrument is a flexible spending account (FSA) debit card, whether the payment instrument is a health savings (HAS) debit card, a merchant account number, or a percentage of past transactions having the BIN.

7. The system of claim 5, wherein the crediting is performed before receiving an indication of an actual issuer amount corresponding to the new exchange, and wherein creating the predictive model is performed via machine learning.

8. The system of claim 5, further comprising:
receiving one or more reports indicating actual issuer amounts for multiple ones of the exchanges, wherein the multiple ones of the exchanges include the new exchange; and wherein the crediting is performed before receiving the one or more reports.

9. The system of claim 5, further comprising initiating a batch fund transfer to the entity that conducted the new exchange before receiving an indication of an actual issuer amount for the new exchange, wherein the batch fund transfer is for adjusted amounts of multiple ones of the exchanges that occurred during a previous time period, and wherein the multiple ones of the exchanges include the new exchange.

10. The system of claim 5, wherein:
the information regarding the new exchange identifies a payment instrument used in the new exchange; and
the payment instrument comprises at least one of a credit card or a debit card.

11. The system of claim 5, wherein the historical information indicates at least one of:
a category code of an entity that conducted a past exchange of the exchanges;
an indication that the past exchange was a card-present transaction or a card-not-present transaction; or
a payment entry method.

12. A method implemented at least in part by a server computing device associated with a payment processing service, the method comprising:
receiving, via one or more point-of-sale (POS) devices, exchange data associated with exchanges using payment instruments of one or more issuers, wherein an issuer amount is associated with each of the exchanges, wherein a POS device of the one or more POS devices comprises a computing device that has installed thereon an instance of a merchant application that configures the computing device to receive the exchange data and transmit the exchange data to the payment processing service;
identifying training data corresponding to the exchanges, wherein the training data includes historical information, determined based at least in part on the exchange data, associated with the exchanges;
determining a transaction feature value based at least in part on the historical information;
creating a predictive model based at least in part on analyzing the training data and the transaction feature value, the predictive model identifying first predicted issuer amounts associated with the exchanges;
receiving information regarding a new exchange via the POS device; and
analyzing, using the predictive model, the information regarding the new exchange to determine a second predicted issuer amount for the new exchange.

13. The method of claim 12, wherein determining the transaction feature value includes determining at least one of a bank identification number (BIN) of the payment instrument, a purchase transaction amount, a merchant category code (MCC), a payment instrument type, a tip amount, a ratio between a tip amount and the purchase transaction amount, a payment method, a payment gateway associated with the payment instrument, whether the transaction is a prepayment, a payment instrument brand, a payment instrument nationality, a sub-category of the payment instrument, whether the payment instrument is a flexible spending account (FSA) debit card, whether the payment instrument is a health savings (HAS) debit card, a merchant account number, or a percentage of past transactions having the BIN.

14. The method of claim 12, wherein the information regarding the new exchange indicates at least one of:
an amount of the new exchange;
a category code of an entity that conducted the new exchange;
an indication that the new exchange was a card-present transaction or a card-not-present transaction; or
a method of entering a payment instrument used in the new exchange.

15. The method of claim 12, further comprising:
calculating an adjusted amount for the new exchange, wherein the adjusted amount comprises a transaction amount of the new exchange minus one or more processing amounts, wherein the one or more processing amounts include the second predicted issuer amount; and
crediting the adjusted amount to an entity that conducted the new exchange.

16. The method of claim 15, wherein the crediting is performed before receiving an indication of an actual issuer amount corresponding to the new exchange.

17. The method of claim 15, further comprising initiating a batch fund transfer to an entity that conducted the transaction before receiving an indication of an actual issuer amount for the new exchange, wherein the batch fund transfer is for adjusted amounts of multiple ones of the exchanges that occurred during a previous time period, and wherein the multiple ones of the exchanges include the new exchange.

18. The method of claim 12, further comprising producing a report that is based at least in part on the second predicted issuer amount.

19. The method of claim 12, wherein the information indicates a payment instrument that is associated with multiple exchange processors, and wherein the first predicted issuer amounts are associated with a first exchange processor of the multiple exchange processors, the method further comprising:
analyzing the information using the predictive model to determine the second predicted issuer amount associated with a second exchange processor of the multiple exchange processors;
selecting at least one of the first or second exchange processors based at least in part on the first predicted issuer amounts and the second predicted issuer amount; and
initiating processing of the new exchange using the at least one of the first or second exchange processors based at least in part on selecting the at least one of the first or second exchange processors.

20. The method of claim 12, wherein the historical information indicates at least one of:
a category code of an entity that conducted at least one of the exchanges;
an indication that the at least one of the exchanges was a card-present transaction or a card-not-present transaction; or
a payment entry method.

* * * * *